(12) United States Patent
Chang

(10) Patent No.: US 8,048,356 B2
(45) Date of Patent: Nov. 1, 2011

(54) METHOD FOR MANUFACTURING KEY-PAD HAVING THREE-DIMENSIONAL PATTERNS

(75) Inventor: Jian-Li Chang, Taoyuan (TW)

(73) Assignee: Ichia Technologies, Inc., Taoyuan (TW)

( * ) Notice: Subject to any disclaimer, the term of this patent is extended or adjusted under 35 U.S.C. 154(b) by 883 days.

(21) Appl. No.: 12/060,545

(22) Filed: Apr. 1, 2008

(65) Prior Publication Data
US 2009/0190990 A1 Jul. 30, 2009

(30) Foreign Application Priority Data

Jan. 29, 2008 (TW) ................................ 97103373 A

(51) Int. Cl.
*B29C 41/20* (2006.01)
*B29C 43/18* (2006.01)
*B29C 35/08* (2006.01)

(52) U.S. Cl. ........ 264/255; 264/250; 264/275; 264/496; 264/132

(58) Field of Classification Search .................. None
See application file for complete search history.

(56) References Cited

U.S. PATENT DOCUMENTS

| | | | |
|---|---|---|---|
| 6,264,869 B1 * | 7/2001 | Notarpietro et al. | 264/247 |
| 6,993,830 B2 * | 2/2006 | Shimizu et al. | 29/622 |
| 7,523,544 B2 * | 4/2009 | Hsu | 29/622 |
| 2008/0224359 A1 * | 9/2008 | Hsu | 264/496 |
| 2009/0057932 A1 * | 3/2009 | Chang | 264/1.38 |
| 2009/0189316 A1 * | 7/2009 | Chang | 264/447 |

FOREIGN PATENT DOCUMENTS

| | | | |
|---|---|---|---|
| CN | 2544299 Y | | 4/2003 |
| JP | 11-144551 | * | 5/1999 |
| JP | 2000-331554 | | 11/2000 |
| JP | 2000-340059 | | 12/2000 |

* cited by examiner

*Primary Examiner* — Edmund H. Lee
(74) *Attorney, Agent, or Firm* — Chun-Ming Shih; HDLS IPR Services

(57) ABSTRACT

A keypad having three-dimensional patterns and a method for manufacturing the same. The keypad includes a base layer, a light-guiding plate, a pattern layer, a shielding layer and a keycap layer. The light-guiding plate is overlapped on the base layer. The pattern layer is provided on the light-guiding plate. A plurality of three-dimensional patterns is provided on the front surface of the pattern layer. The shielding layer is coated on the back surface of the pattern layer, and is formed with a plurality of hollowed regions to correspond to the three-dimensional patterns. The keycap layer is overlapped on the pattern layer and formed with a plurality of keycaps to correspond to the three-dimensional patterns. In addition, the present invention provides a method for manufacturing keypad having three-dimensional patterns. Via the above arrangement, the recognition and aesthetic feeling of each three-dimensional pattern can be increased.

7 Claims, 18 Drawing Sheets

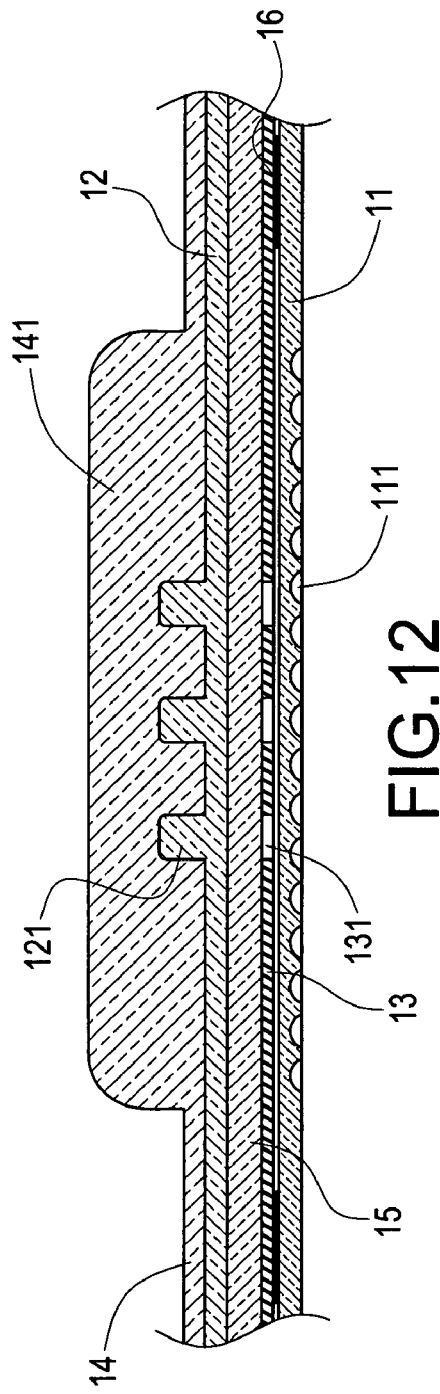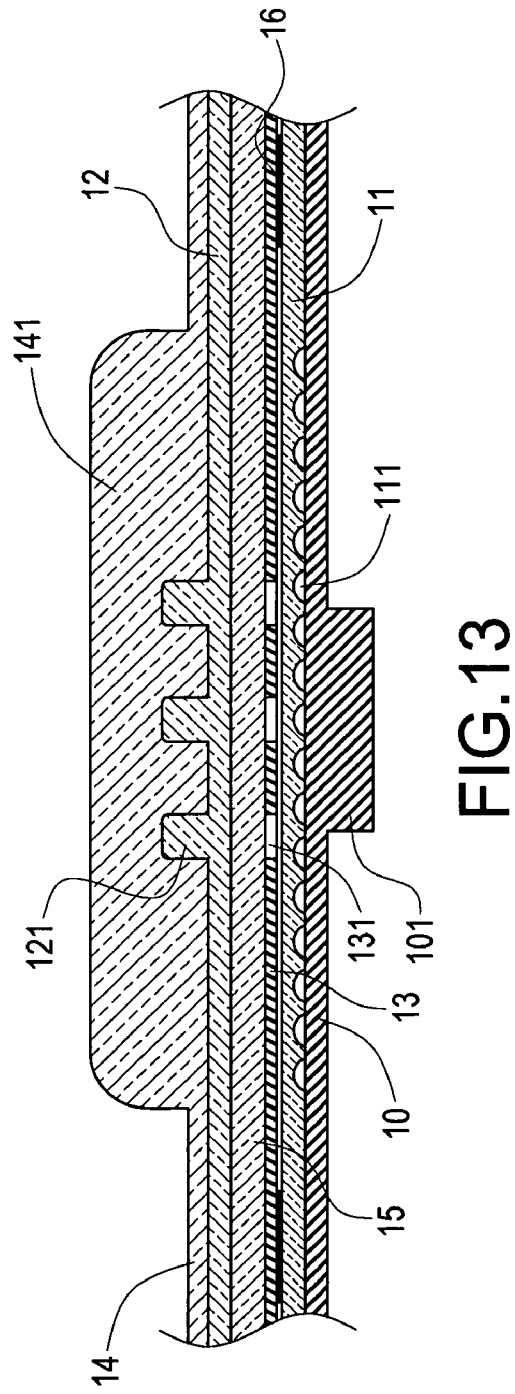

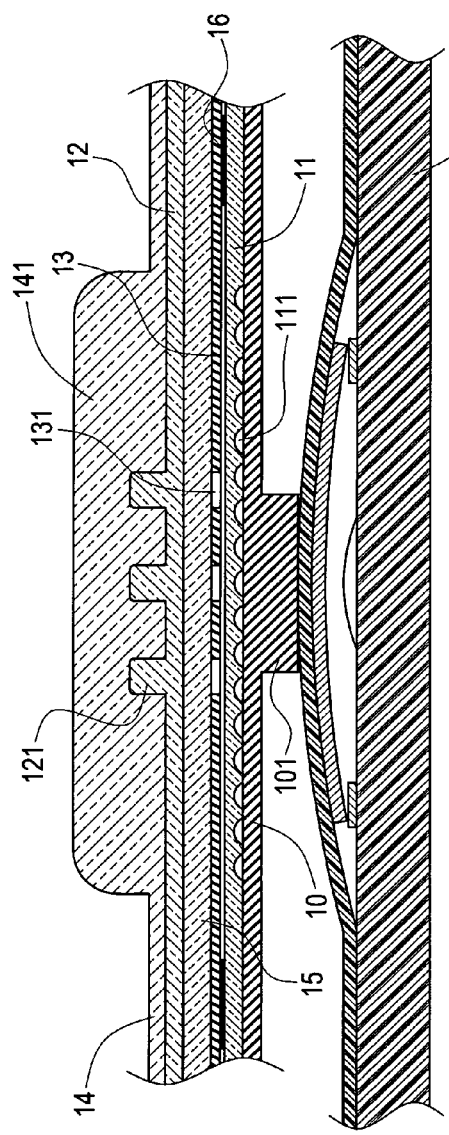
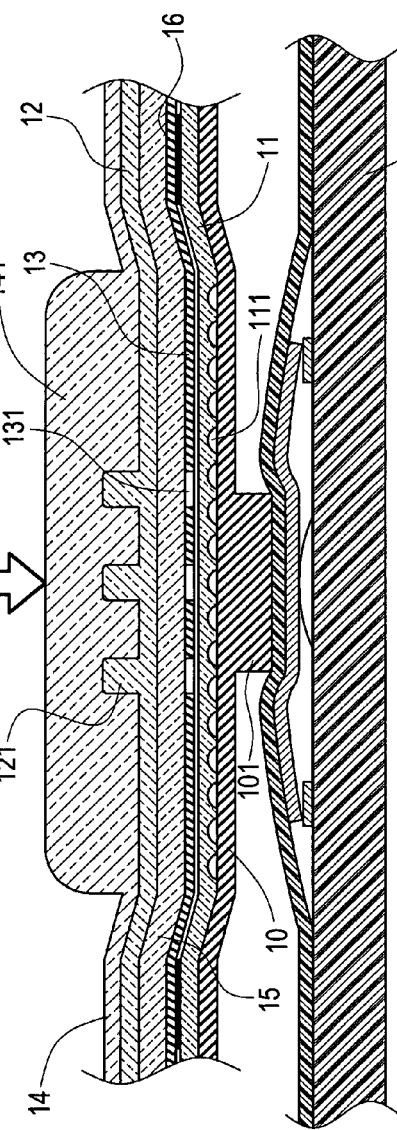

METHOD FOR MANUFACTURING KEY-PAD HAVING THREE-DIMENSIONAL PATTERNS

BACKGROUND OF THE INVENTION

1. Field of the Invention

The present invention relates to a keypad and a method for manufacturing the same, and in particular to a keypad having three-dimensional patterns and a method for manufacturing the same.

2. Description of Prior Art

With the progress and development of technology, modern consumers request electronic products such as mobile phone, personal digital assistant (PDA), ultra mobile personal computer (UMPC) to be designed in a more personalized and delicate manner. However, these electronic products can be only operated via keypad so as to transmit signals from a user to the electronic products or vice versa. Moreover, the user requests the keypad of the electronic product to be varied continuously. Therefore, it is an important issue for the manufacturers of keypad to develop keypad of more competitiveness to satisfy the request of modern people.

Japanese Patent Publication No. 2000-340059 discloses a conventional keypad and a method for manufacturing the same. As shown in FIG. 1, the keypad includes a base layer 10a, a pattern layer 12a, a keycap layer 14a and a colored light-transmitting film 17a. The front surface of the pattern layer 12a is provided with three-dimensional patterns 121a. The keycap layer 14a is provided with troughs to correspond to the three-dimensional patterns 121a and the keycap layer 14a is overlapped on the front surface of the pattern layer 12a. The back surface of the pattern layer 12a is printed with the colored light-transmitting film 17a. The base layer 10a is adhered to the underside of the light-transmitting film 17a. With the above arrangement, a keypad can be achieved. Further, the method for manufacturing the keypad includes a step of overlapping a pattern layer and a keycap layer. First, a bottom plate and three-dimensional patterns are integrally formed. The three-dimensional patterns protrude from the top surface of the bottom plate. Next, the top surface of the three-dimensional pattern is printed. Then, the three-dimensional patterns of the bottom plate are embedded in the keycap layer via a hot welding process.

Further, Japanese Patent publication No. 2000-331554 discloses another kind of keypad and a method for manufacturing the same. According to this method for manufacturing the keypad, cavities having three-dimensional patterns are formed in an inner surface of a keycap layer. The inner surface of the keycap layer is printed with a light-shielding film. Then, the inner surface of the cavity having three-dimensional patterns is coated with a light-transmitting colored film. In this way, the method for manufacturing keypad can be completed.

Although the above-mentioned keypad and the method for manufacturing the same can obtain keypads having three-dimensional patterns, Patent Publication No. 2000-340059 only teaches a step of printing on the top surface of the three-dimensional patterns. Therefore, the whole shape of the three-dimensional pattern cannot be displayed sufficiently, and thus the recognition and aesthetic feeling thereof are not good. Further, since both the above-mentioned patent publications do not provide a light-guiding plate, the illuminated area is relatively small and thus it can be only applied to a relative small keypad or single keypad. Therefore, for a keypad having a large operating area, the conventional keypad cannot satisfy this requirement for use.

Further, China Patent Publication No. CN2544299Y discloses another keypad assembly, which includes a keypad layer, a first pattern layer, a refracting layer and a second pattern layer. The keypad layer is a light-transmitting body. The first pattern layer is an opaque body that is overlapped with the keypad layer. The first pattern layer is provided with first patterns formed by hollowed portions. The refracting layer is a translucent body that is located below the keypad layer and the first pattern layer. The underside of the refracting layer is formed with a back surface. The second pattern layer is an opaque body that is attached to the back surface of the refracting layer. The second pattern layer is provided with second patterns formed by hollowed portions. The light emitted by light-emitting elements is projected toward the keypad layer from the underside of the second pattern layer, so that the first and second patterns can be displayed on the keypad layer, thereby achieving a multiple displaying effect. Although the above-mentioned keypad assembly has a multiple displaying effect, it relies on the fact that the first and second patterns are formed on the first and second pattern layers respectively. As a result, the total thickness of the keypad would be large and thus increasing the weight thereof. Therefore, it is not suitable for the electronic products that tend to be produced toward more and more compact. Further, the light-emitting element is formed underneath the second pattern layer, increasing the total height. As a result, the thickness of the electronic product cannot be reduced sufficiently. Moreover, the refracting layer is a translucent body, so that the recognition and aesthetic feeling of the displayed second pattern are not good.

SUMMARY OF THE INVENTION

The present invention is to provide a keypad having three-dimensional patterns and a method for manufacturing the same. With the above arrangement, patterns such as characters, symbols or icons can be displayed in the keycaps in a three-dimensional manner, thereby increasing the recognition and aesthetic feeling.

The present invention provides a keypad having three-dimensional patterns, which includes a base layer, a light-guiding plate, a pattern layer, a shielding layer and a keycap layer. The light-guiding plate is overlapped on the base layer. The pattern layer is provided on the light-guiding plate. A plurality of three-dimensional patterns is provided on the front surface of the pattern layer. The shielding layer is coated on the back surface of the pattern layer, and is formed with a plurality of hollowed regions to correspond to the three-dimensional patterns. The keycap layer is overlapped on the pattern layer. The keycap layer is formed with a plurality of keycaps to correspond to the three-dimensional patterns.

The present invention provides a method for manufacturing keypad having three-dimensional patterns, which includes the steps of:

a) preparing a first mold, and filling a first ultra-violet curable resin in the first mold;

b) disposing a shaping layer in the first mold, and overlapping the shaping layer on the first ultra-violet curable resin;

c) irradiating the first ultra-violet curable resin with an ultra-violet lamp to cure the resin to form a pattern layer, forming a plurality of three-dimensional patterns on a front surface of the pattern layer;

d) preparing a second mold, and filling a second ultra-violet resin into the second mold;

e) disposing the assembled structure formed in the step c) in the second mold and overlapping it on the second ultra-violet curable resin;

f) irradiating the second ultra-violet curable resin with the ultra-violet lamp to cure the resin to form a keycap layer, and forming a plurality of keycaps on a front surface of the keycap layer; and g) printing a shielding layer on a back surface of the shaping layer, and forming a plurality of hollowed regions beneath the three-dimensional patterns.

BRIEF DESCRIPTION OF THE DRAWINGS

FIG. 12 is an assembled cross-sectional view showing the assembled structure of FIG. 10 and a light-guiding plate;

FIG. 13 is an assembled cross-sectional view showing the assembled structure of FIG. 12 and a base layer;

FIG. 16 is an assembled cross-sectional view showing the state before the action of the keypad of FIG. 15 and the circuit board;

FIG. 17 is an assembled cross-sectional view showing the state after the action of the keypad of FIG. 15 and the circuit board;

DETAILED DESCRIPTION OF THE INVENTION

Figure 1:
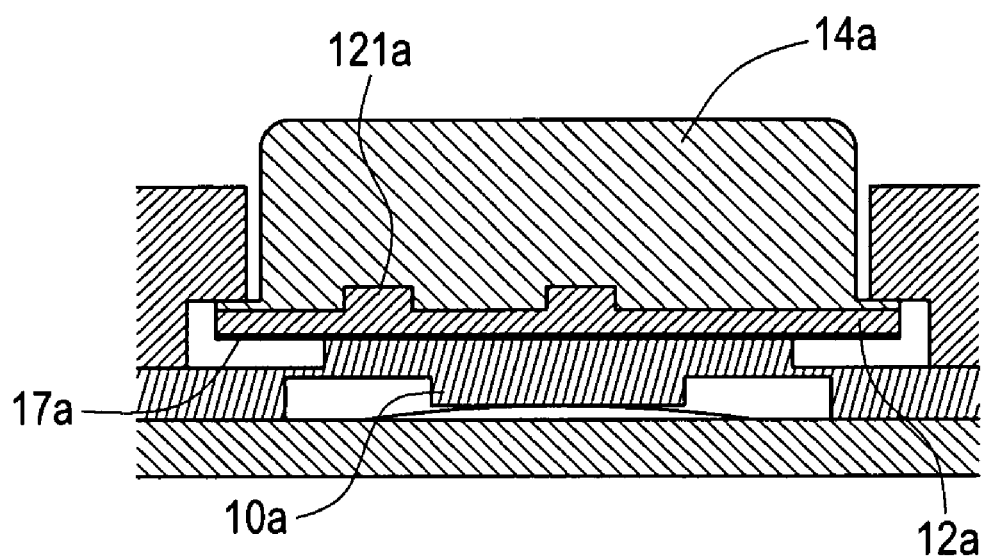
FIG. 1 is an assembled cross-sectional view showing a conventional keypad assembly.
Figure 2:
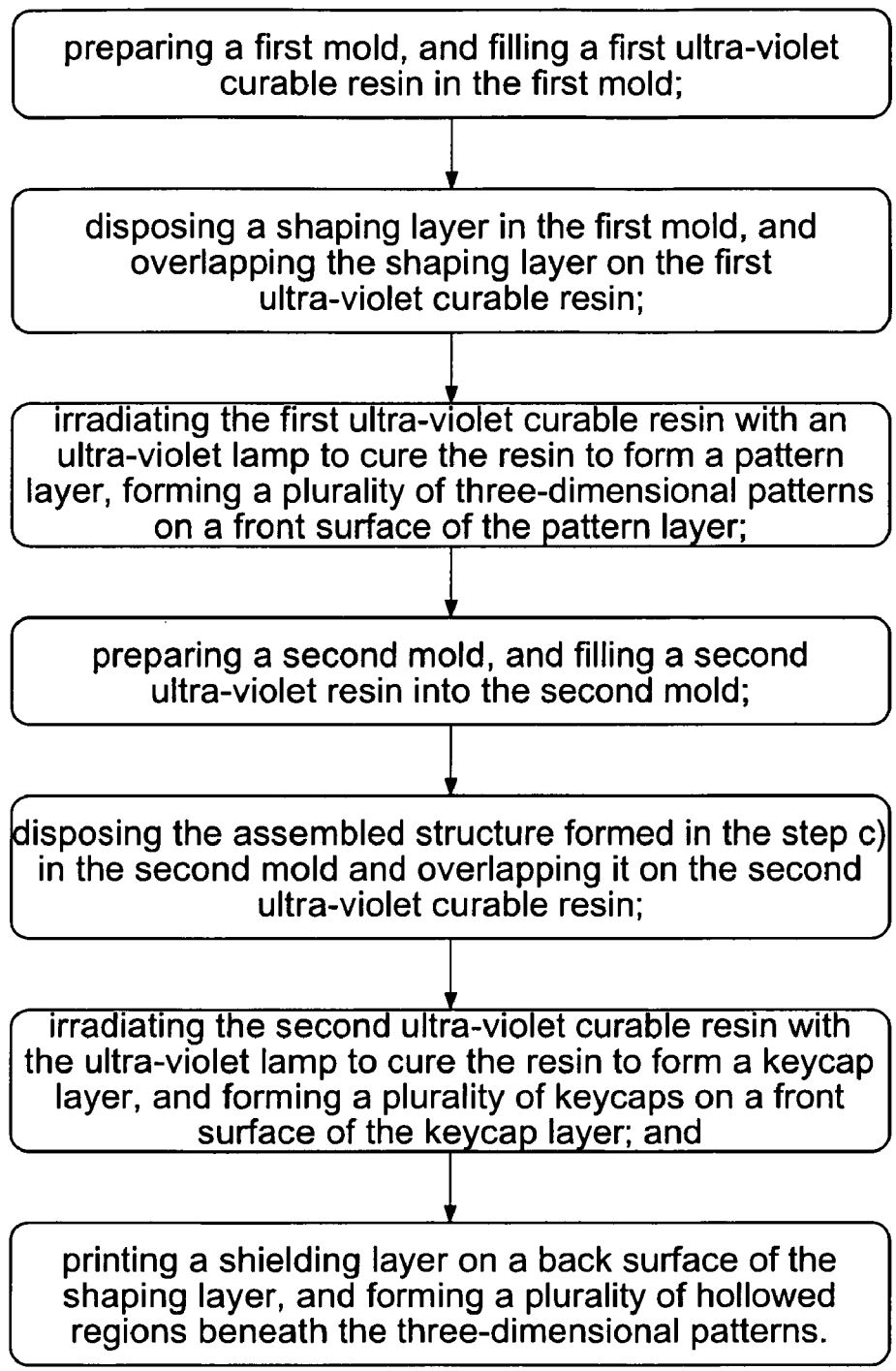
FIG. 2 is a flow chart showing the method for manufacturing keypad of the present invention.

The detailed description and technical contents of the present invention will be explained with reference to the accompanying drawings. However, the drawings are illustrative only, but not used to limit the scope of the present invention.

The keypad having three-dimensional patterns manufactured by the present invention includes a base layer 10, a light-guiding plate 11, a pattern layer 12, a shielding layer 13, a keycap layer 14, and a shaping layer 15, as shown in FIG. 13.

Figure 3:
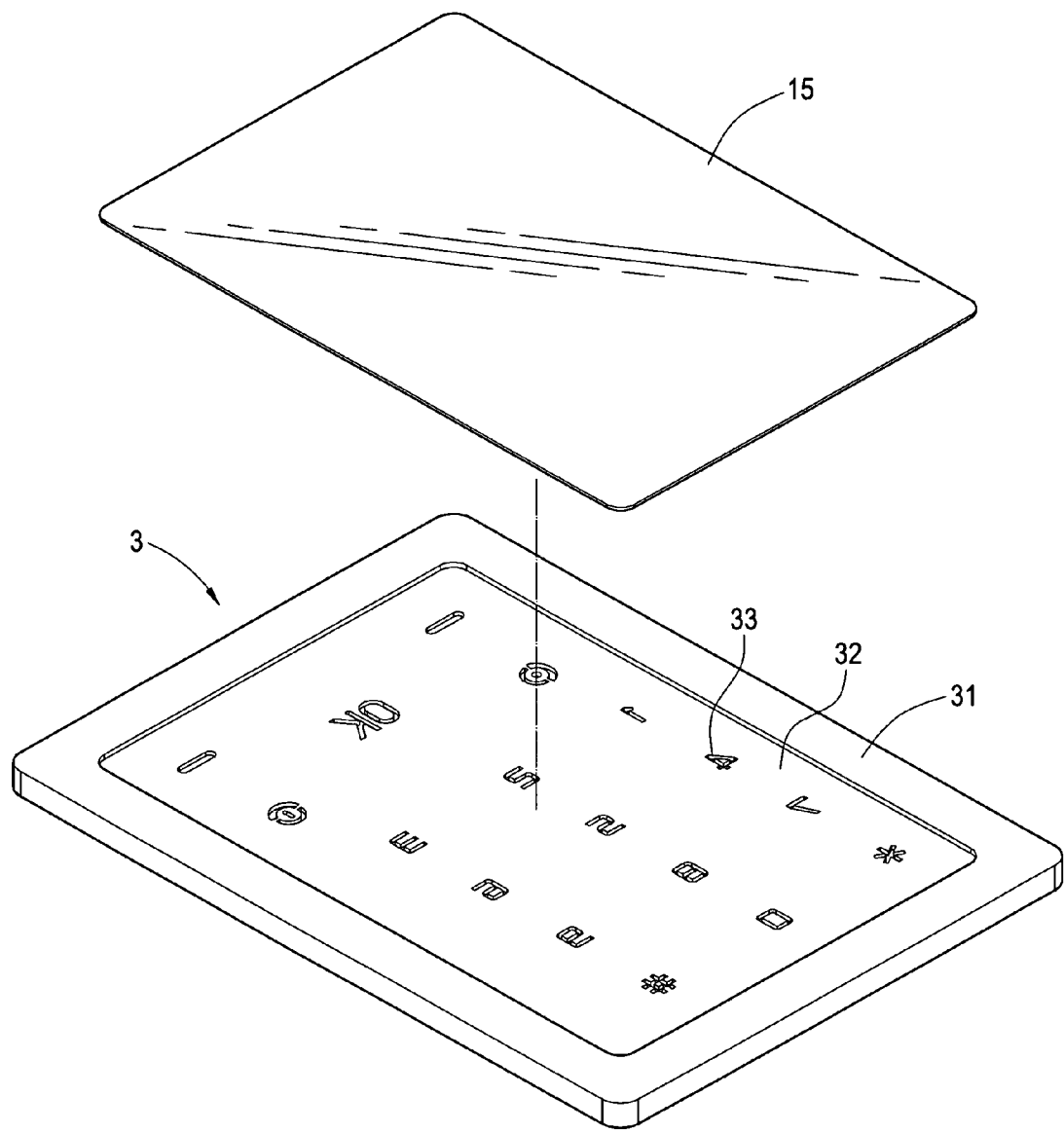
FIG. 3 is an exploded perspective view showing a first mold and the shaping layer of the present invention.
Figure 4:
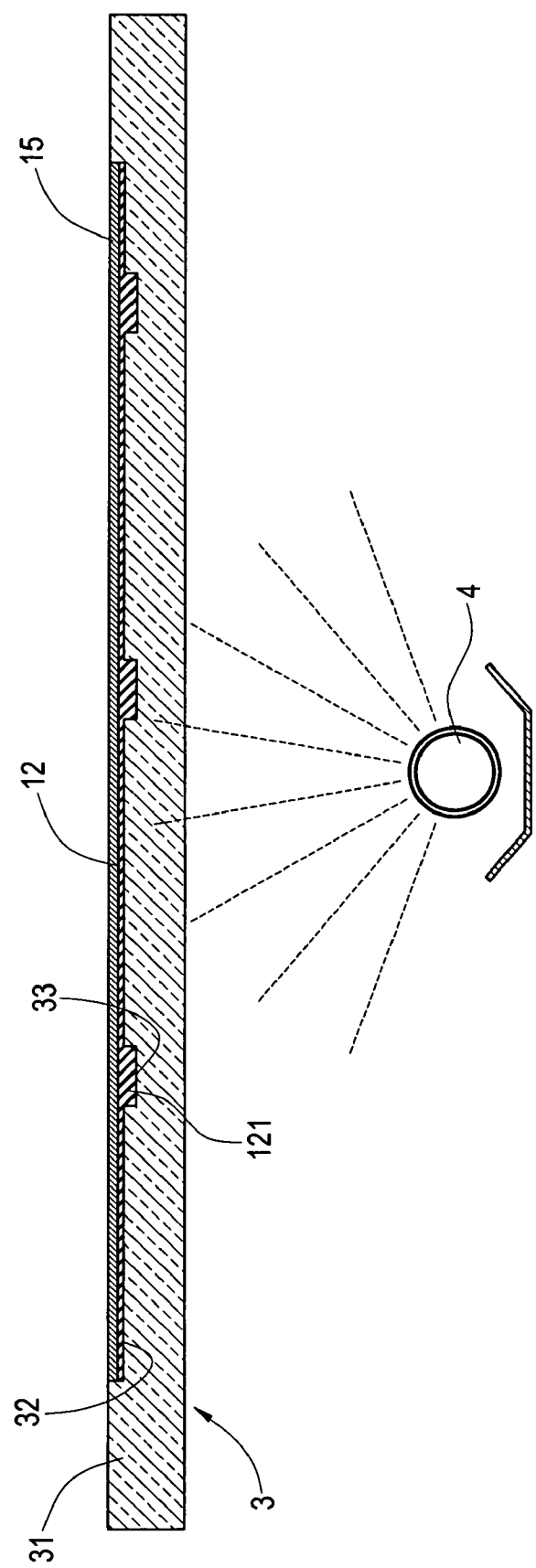
FIG. 4 is a cross-sectional view showing the pattern layer of the present invention being irradiated with a ultra-violet lamp.
Figure 5:
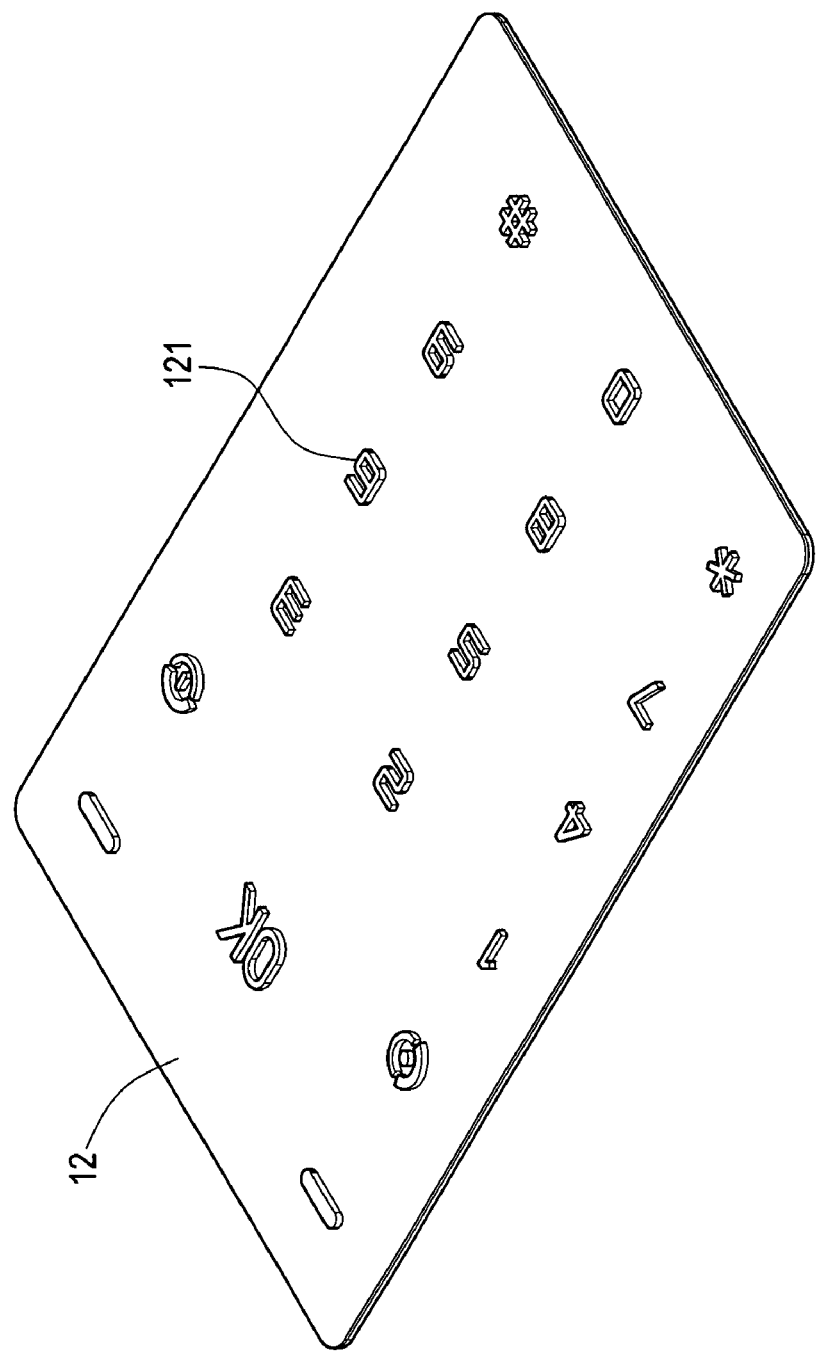
FIG. 5 is a schematic view showing the external appearance of the assembled structure having the pattern layer and the shaping layer of the present invention.
Figure 6:
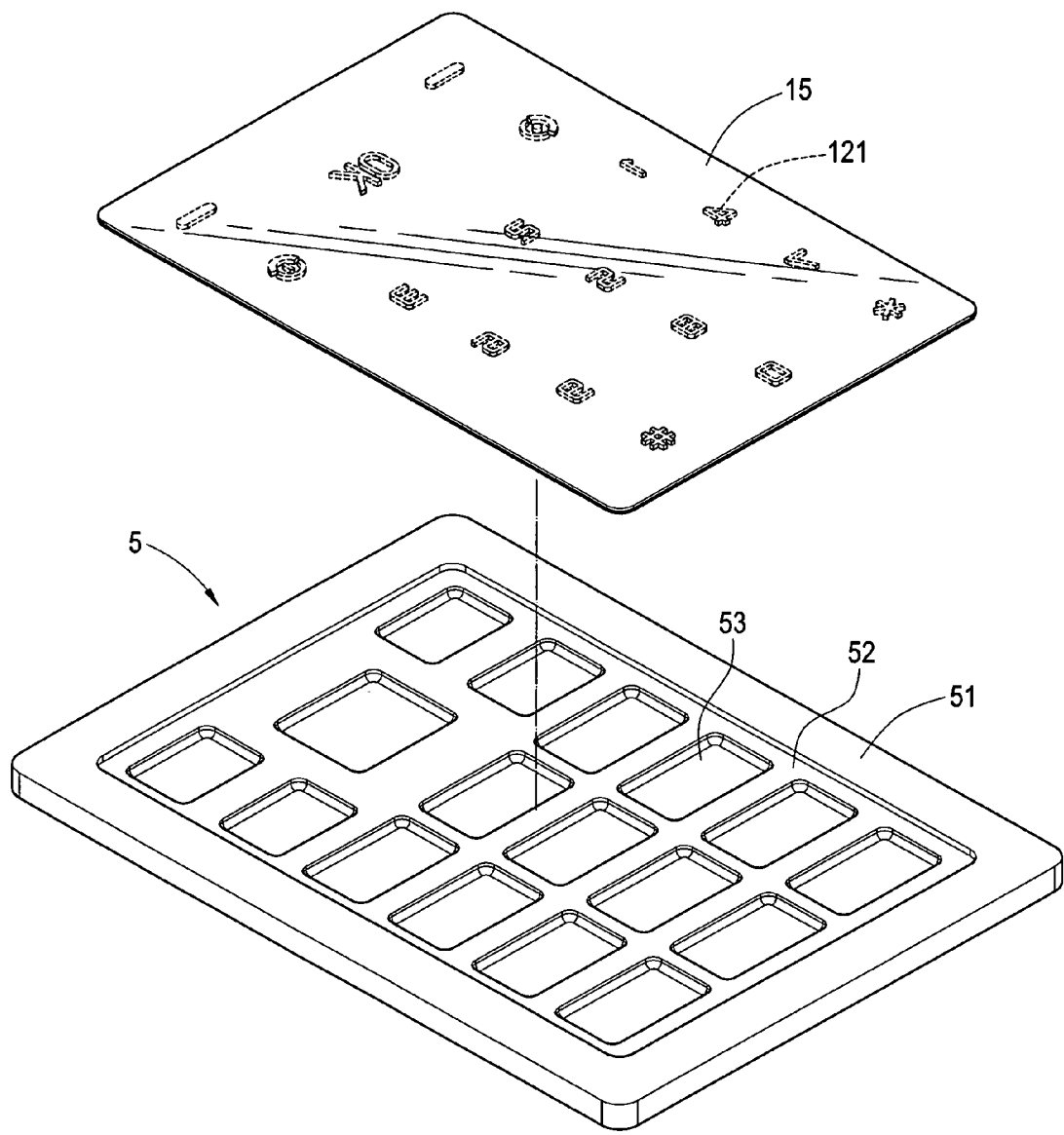
FIG. 6 is an exploded perspective view showing a second mold and the assembled structure of the present invention.
Figure 7:
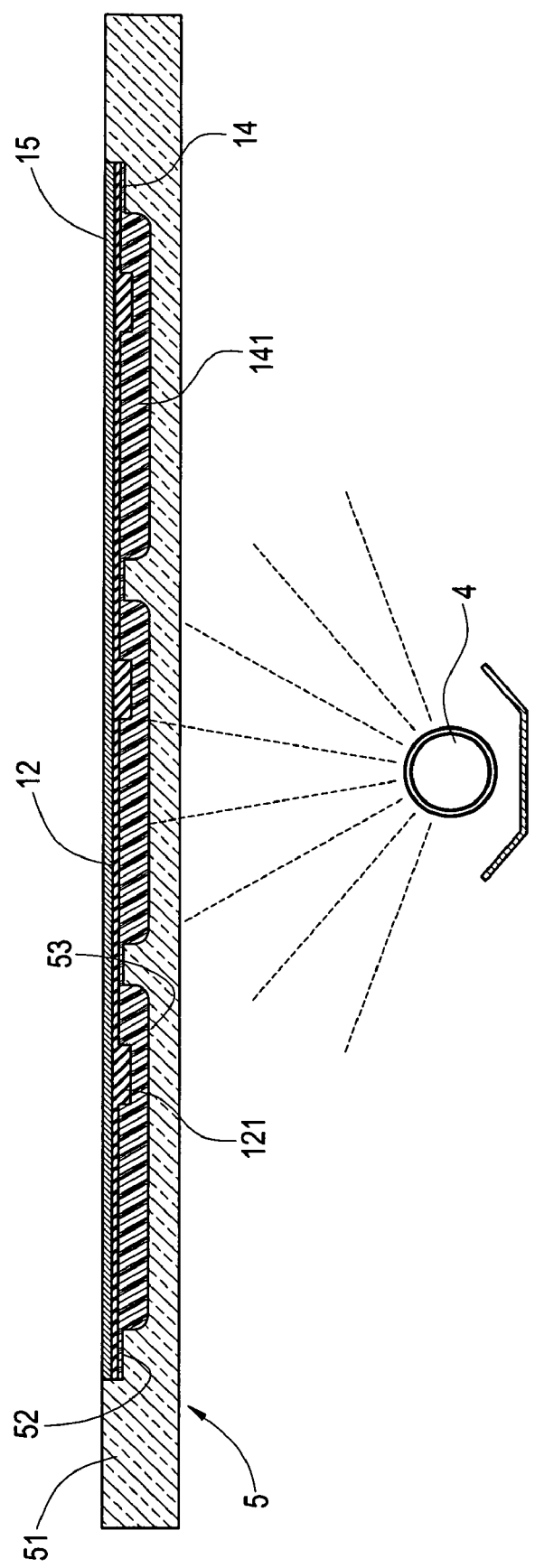
FIG. 7 is a cross-sectional view showing the keycap layer of the present invention being irradiated with a ultra-violet lamp.
Figure 8:
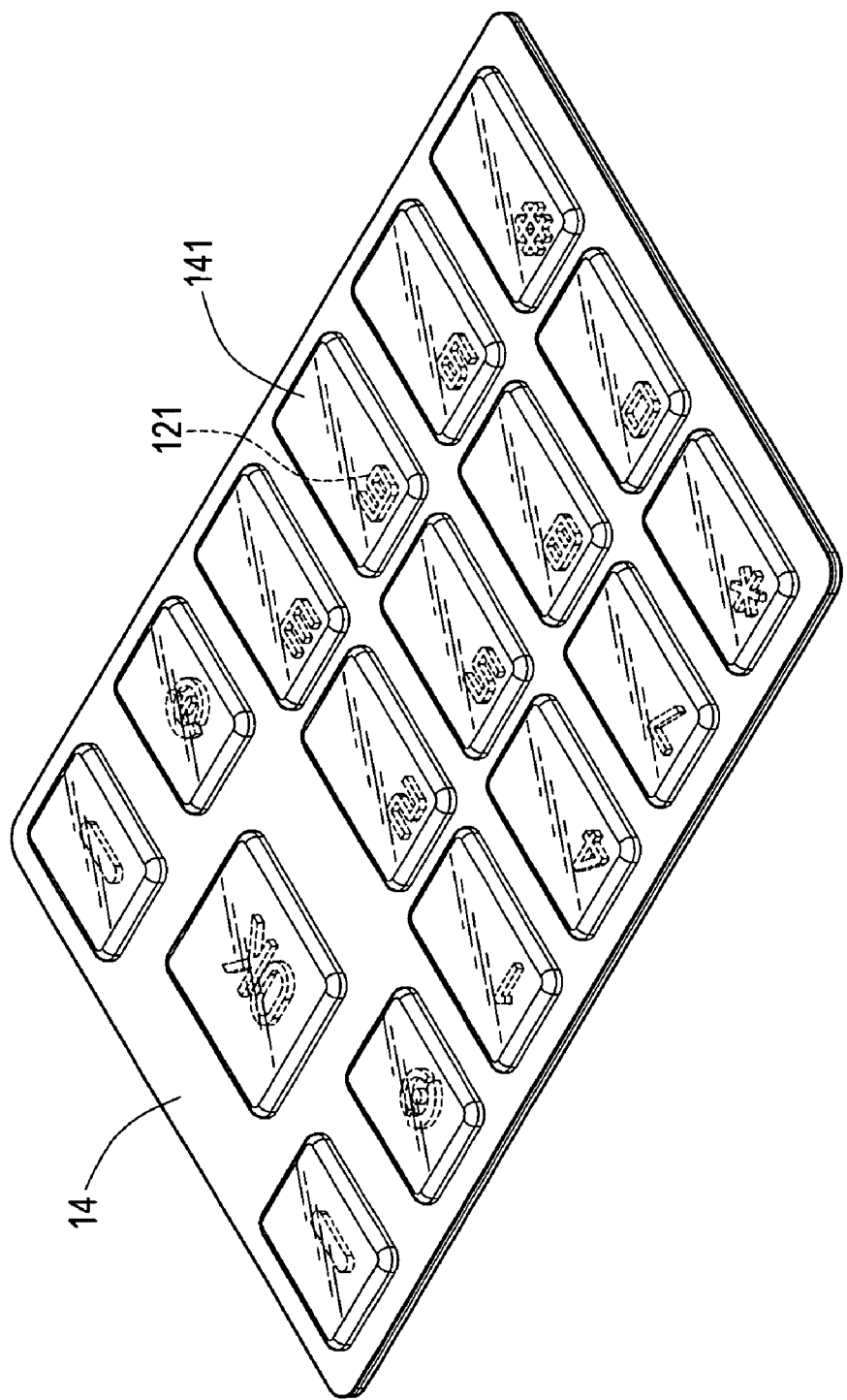
FIG. 8 is a schematic view showing the external appearance of the keypad after finishing the step g) of the method of the present invention.
Figure 9:
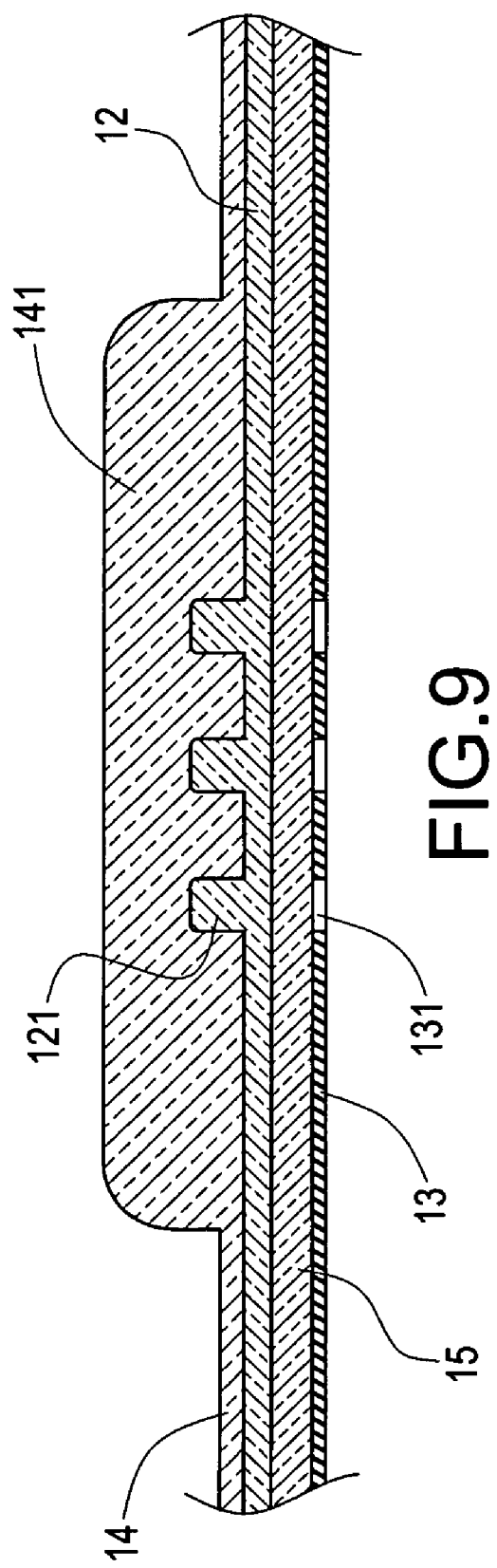
FIG. 9 is an assembled cross-sectional view showing the assembled structure of FIG. 8 and a shielding layer.
Figure 10:
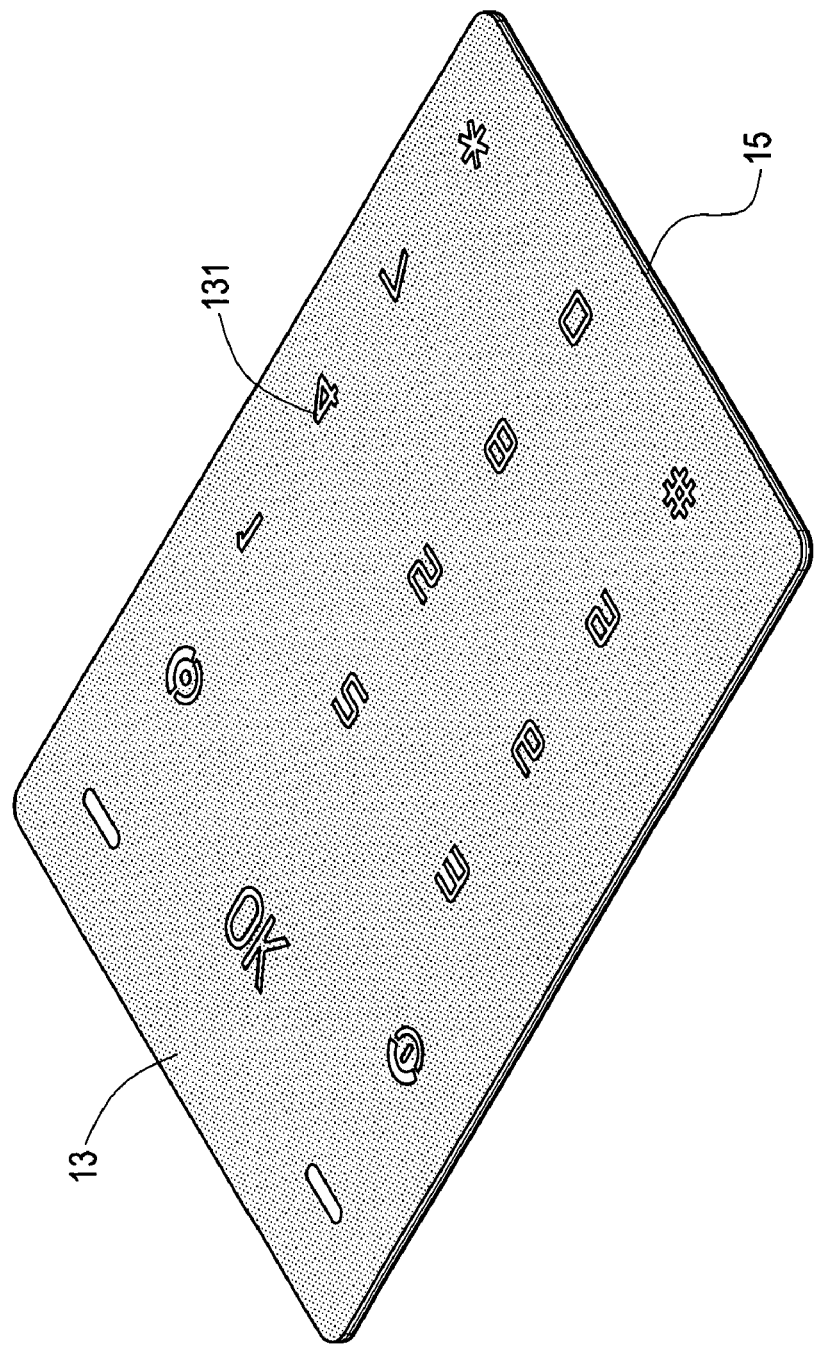
FIG. 10 is a schematic view showing the external appearance of the back surface of the assembled structure in FIG. 9.

Please refer to FIGS. 2 to 8. The present invention provides a keypad having three-dimensional patterns and a method for manufacturing the same. The method includes the steps as follows.

a) A first mold 3 is prepared, and a first ultra-violet curable resin in filled the first mold 3 (FIG. 3). In this step, the first mold 3 has a rectangular block 31 made of a light-transmitting material. The top of the block 31 is provided with a recess 32. The inner surface of the recess 32 is provided with a plurality of pattern cavities 33 such as characters, symbols, icons or the like. In the present embodiment, the pattern cavity 33 includes any of "0~9", "*", "#", "OK" etc., but it is not limited thereto. In manufacturing, the first ultra-violet curable resin (not shown) is filled uniformly into the recess 32 and each three-dimensional pattern cavity 33. Then, the resin is leveled by means of a pressing plate or roller (not shown).

b) A shaping layer 15 is disposed in the first mold 3, and is overlapped on the first ultra-violet curable resin as shown in FIG. 3. In this step, the shaping layer 15 can be made of any one of PET, PC or the mixture of PMMA and PC. In manufacturing, the shaping layer 15 is overlapped on the upper surface of the first ultra-violet curable resin at a position corresponding to the recess 32.

c) The first ultra-violet curable resin is irradiated with a ultra-violet lamp 4, so that the resin is cured to form a pattern layer 12. A plurality of three-dimensional patterns 121 is formed on a front surface of the pattern layer 12, as shown in FIG. 4. In this step, since the block 31 has a light-transmitting property, the underside of the block 31 can be irradiated with ultra-violet light by using the ultra-violet lamp 4. In this way, the first ultra-violet curable resin is cured to form a pattern layer 12, and the pattern layer 12 can be any one of a light-transmitting body or a translucent body. A plurality of corresponding three-dimensional patterns 121 is formed in the pattern cavities 33 respectively. The three-dimensional patterns 121 can be any one of characters, symbols, icons or the combination thereof. FIG. 5 is a perspective view showing the front surface of an assembled structure having the shaping layer 15 and the pattern layer 12 after being removed from the first mold 3. In addition, the inner surfaces of the recess 32 and the pattern cavities 33 mentioned in the step a) can be processed by means of sand blasting, so that the front surface of the pattern layer 12 can form a rough surface (not shown), thereby enhancing the brightness of the three-dimensional patterns 121, and increasing the strength of the combination of the pattern layer 12 with the keycap layer 14.

d) A second mold 5 is prepared. A second ultra-violet curable resin is filled into the second mold 5 (FIG. 6). In this step, the second mold 5 has a rectangular block 51 made of a light-transmitting material. The top of the block is provided with a recess 52. The inner surface of the recess 52 is provided with a plurality of keycap cavities 53. In manufacturing, the second ultra-violet curable resin is filled uniformly into the recess 52 and each keycap cavity 53. Then, the resin is leveled by means of a pressing plate or roller (not shown).

e) The assembled structure formed in the step c) is disposed in the second mold 5, and is overlapped on the first ultra-violet curable resin (FIG. 7). In this step, the assembled structure having the shaping layer 15 and the pattern layer 12 is overlapped on the upper surface of the second ultra-violet curable resin. In this way, each three-dimensional pattern 121 is located at a position corresponding to each keycap cavity 53, and each three-dimensional pattern 121 is embedded in the second ultra-violet curable resin.

f) The second ultra-violet curable resin is irradiated with the ultra-violet lamp 4, so that the resin is cured to form a keycap layer 14. A plurality of keycaps 141 is formed on a front surface of the keycap layer 14 as shown in FIGS. 7 and 8. In this step, since the block 51 has a light-transmitting property, the underside of the block 51 is irradiated with the ultra-violet light generated by the ultra-violet lamp 4, so that the second ultra-violet curable resin can be cured to form a keycap layer 14. A plurality of keycaps 141 is formed on the front surface of the keycap layer 14, and each three-dimensional pattern 121 is formed in each keycap 141. FIG. 8 is a perspective view showing the front surface of the keypad that is completely cured and removed from the second mold 5.

g) A shielding layer 13 is printed on a back surface of the shaping layer 15. A plurality of hollowed regions 131 is formed beneath the three-dimensional patterns 121 (FIGS. 9 and 10). In this step, a die (not shown) having the three-dimensional patterns 121 is prepared first. Then, the die is attached to the back surface of the shaping layer 15. The shielding layer 13 such as inks is printed and coated on the back surface of the shaping layer 15. Finally, the die is removed from the back surface of the shaping layer 15, thereby forming a plurality of hollowed regions 131 exactly beneath the three-dimensional patterns 121. Via the above steps, the manufacturing of keypad of the present invention can be completed. The shielding layer 13 can be also printed and coated on the back surface (not shown) of the pattern layer 12. Further, a plurality of hollowed portions 131 is formed underneath the three-dimensional patterns 121.

Figure 11:
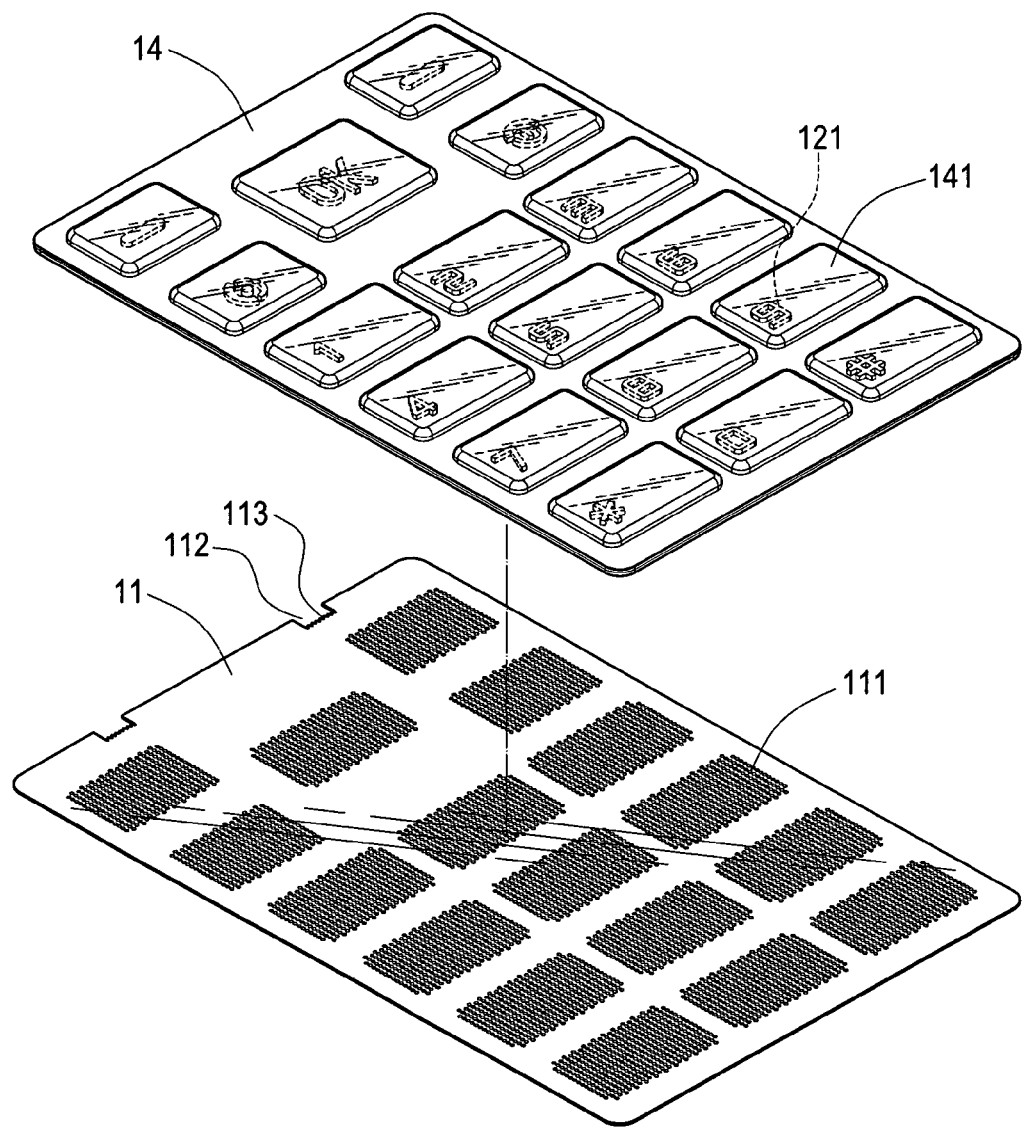
FIG. 11 is an exploded perspective view showing the assembled structure of FIG. 10 and a light-guiding plate.

Further, the present invention includes a step h) of overlapping a light-guiding plate 11 on the back surface of the shielding layer 13 (FIGS. 11 and 12). In this step, the light-guiding plate 11 is formed with a plurality of light-guiding microstructures 111 exactly beneath each keycap 141 and each three-dimensional pattern 121. The light is refracted by the light-guiding structures and emitted from the upside of the light-guiding plate 11. Further, one side of the light-guiding plate 11 is provided with two notches 112. The inner surfaces of the two notches 112 are formed with tooth-like stripes 113. In addition, a binding layer 16 (FIG. 12) is connected between the light-guiding plate 11 and the shaping layer 15. The binding layer 16 may be acrylic glue and is applied to the positions avoiding the light-guiding microstructures 111.

Further, the present invention includes a step i) of connecting a base layer 10 to the back surface of the light-guiding plate 11 by pressing (FIG. 13). In this step, the base layer 10 may be made of silicone, which is connected with the underside of the light-guiding plate 11 by means of adhesion. Alternatively, after the light-guiding plate 11 and the base layer 10 are connected with each other by means of a hot pressing process, the light-guiding plate 11 is adhered to the underside of the shaping layer 15 via the binding layer 16. Further, the lower surface of the base layer 10 is formed with bumps 101 each of which is located exactly beneath the corresponding keycap 141. Via this arrangement, the keypad of another embodiment of the present invention can be completed.

Figure 14:
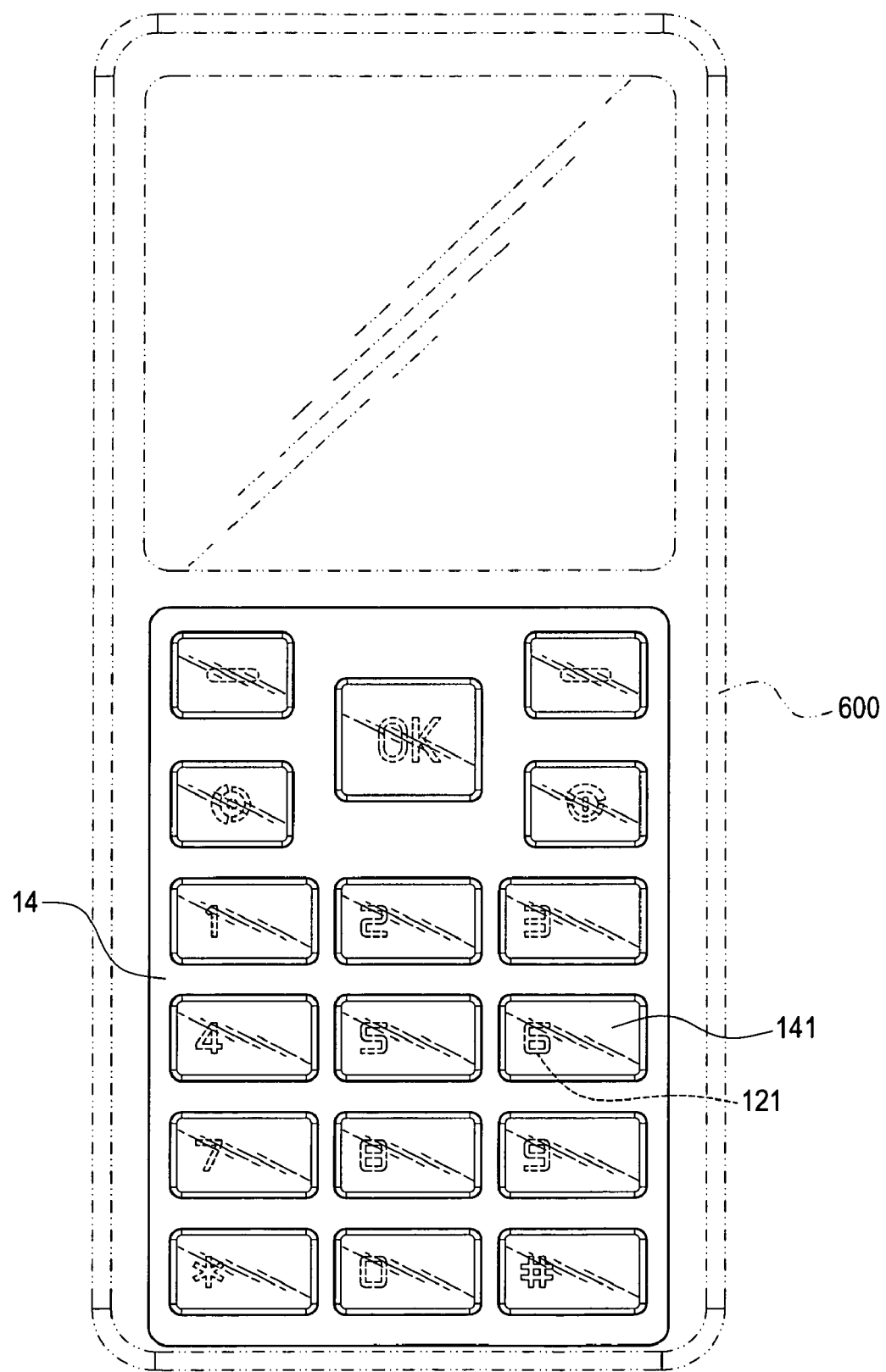
FIG. 14 is an assembled view showing the keypad of the present invention being used in a mobile phone.
Figure 15:
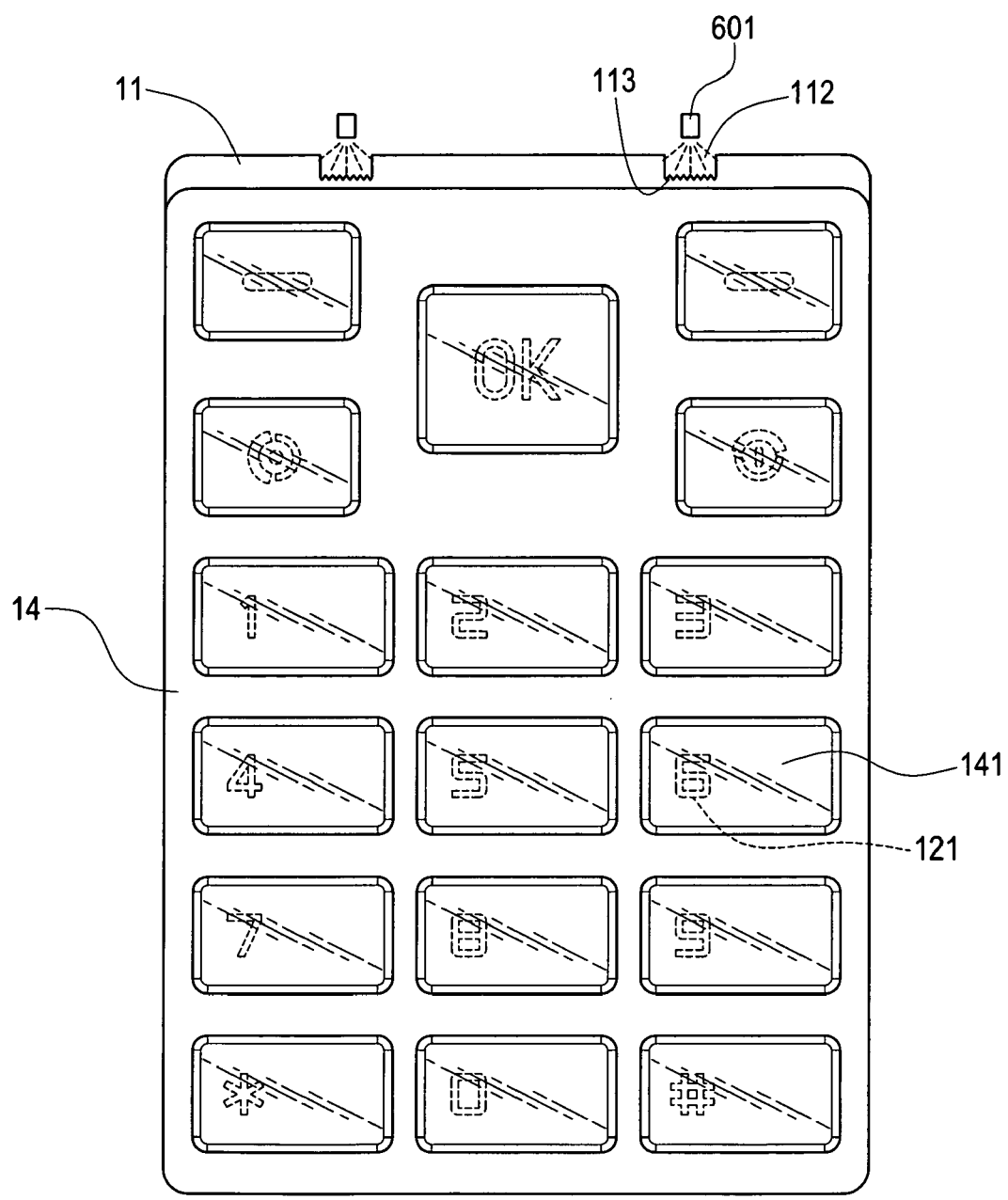
FIG. 15 is a schematic view showing the arrangement of the keypad of FIG. 14 and light-emitting elements.

Please refer to FIGS. 14 to 17. FIG. 14 is an assembled view showing the keypad of the present invention being used in a mobile phone. FIG. 15 is a schematic view showing the arrangement of the keypad of FIG. 14 and light-emitting elements. FIG. 16 is an assembled cross-sectional view showing the state before the action of the keypad of FIG. 15 and a circuit board. FIG. 17 is an assembled cross-sectional view showing the state after the action of the keypad of FIG. 15 and the circuit board. The keypad of the present invention can be used in a mobile phone 600. Light-emitting elements 601 (FIG. 15) and a circuit board 602 (FIG. 16) are arranged on the mobile phone 600. The two notches 112 of the light-guiding plate 11 are arranged to correspond to the light-emitting elements 601. The tooth-like stripes 113 are used to increase the ratio and uniformity of the light of the light-emitting elements 601 entered the light-guiding plate 11. In use, pressing the keycap 141 can contact a conductive terminal of the circuit board 602 via the bump 101 of the base layer 10, thereby generating a corresponding trigger signal.

Figure 18:
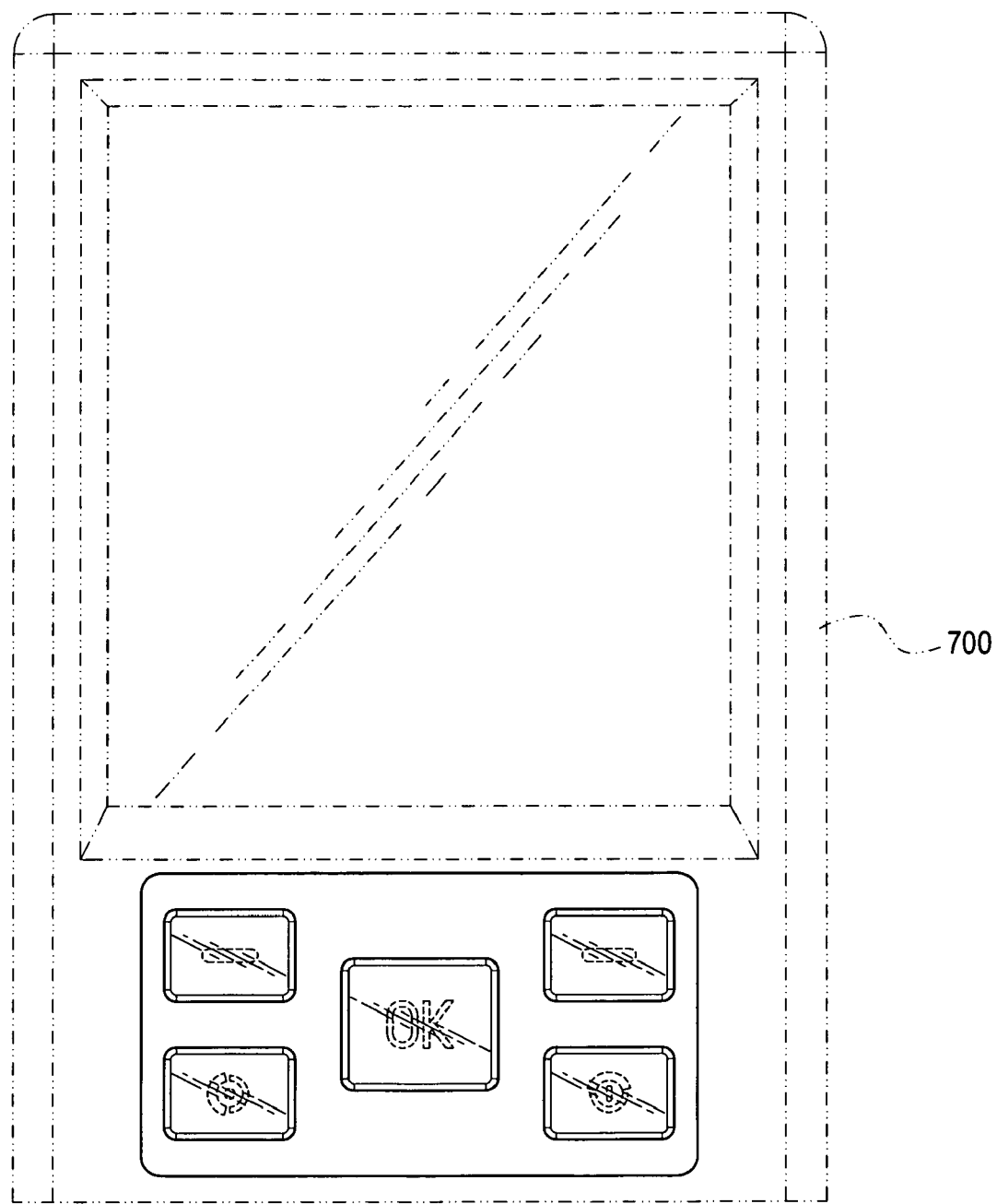
FIG. 18 is an assembled schematic view showing the keypad of the present invention being used in a PDA.
Figure 19:
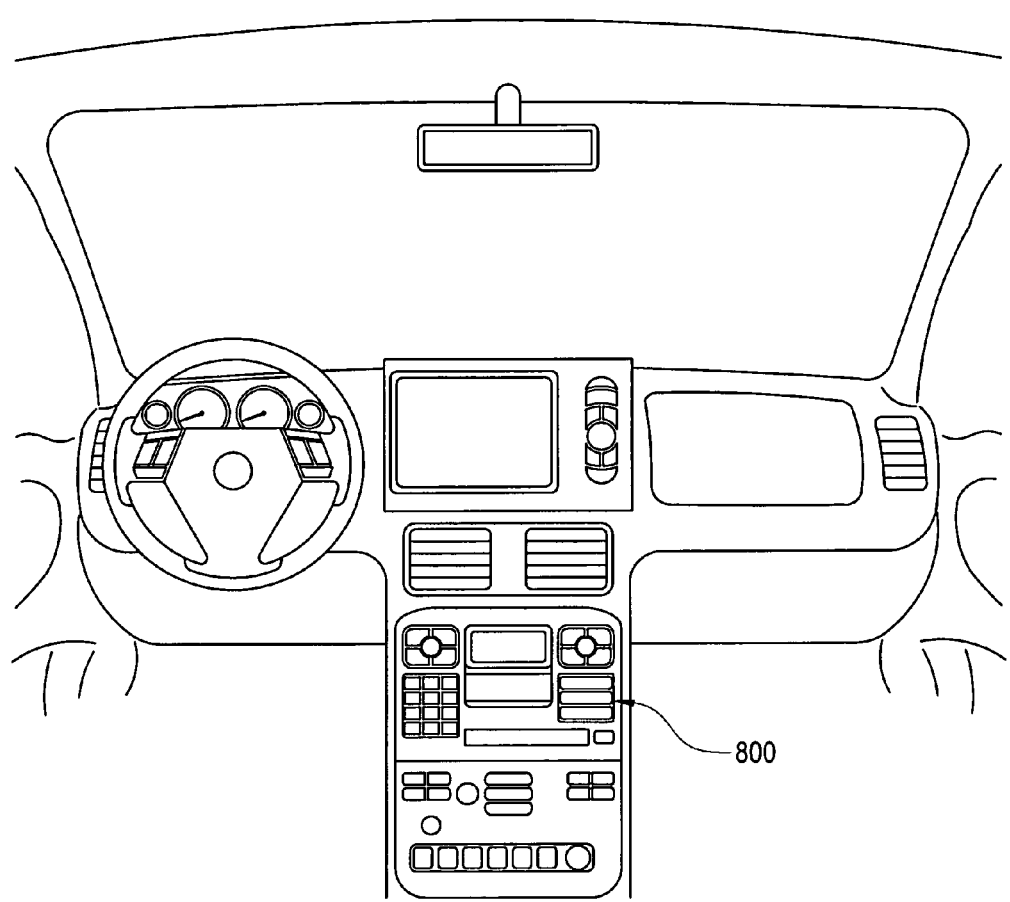
FIG. 19 is an assembled schematic view showing the keypad of the present invention being used in an automobile stereo panel.
Figure 20:
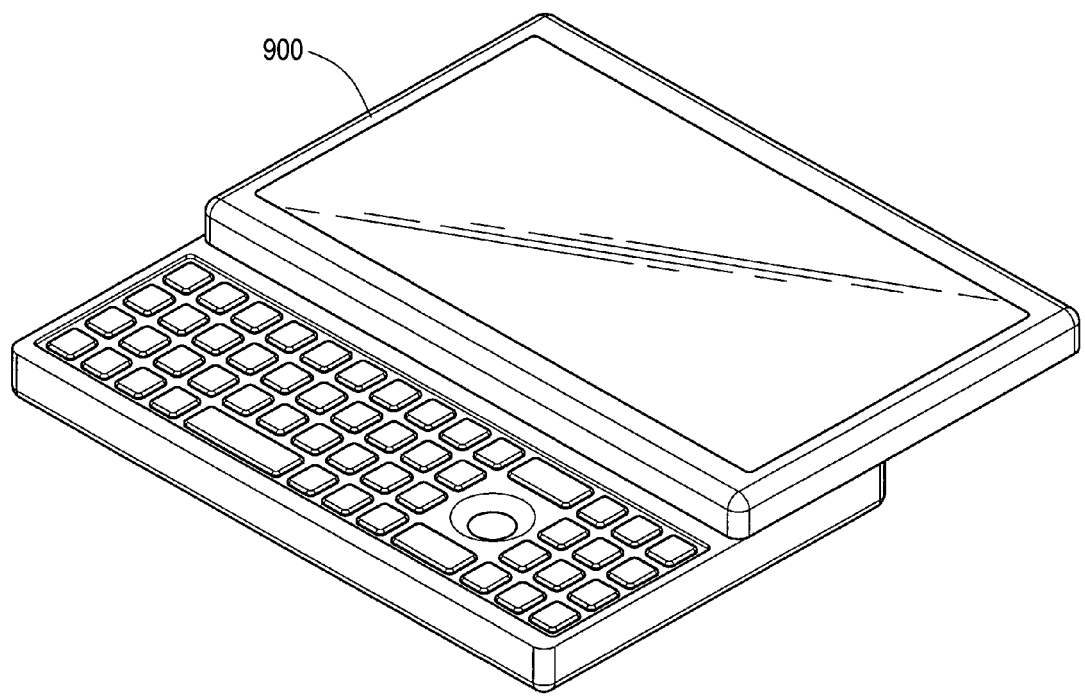
FIG. 20 is an assembled schematic view showing the keypad of the present invention being used in an UMPC.

Please refer to FIGS. 18 to 20. FIG. 18 is an assembled schematic view showing the keypad of the present invention being used in a PDA. FIG. 19 is an assembled schematic view showing the keypad of the present invention being used in an automobile stereo panel. FIG. 20 is an assembled schematic view showing the keypad of the present invention being used in a UMPC. In addition to the mobile phone 600, the present invention can be also used in the keypad of a personal digital assistant (PDA) 700 as shown in FIG. 18, an automobile stereo panel 800 as shown in FIG. 19, or an ultra mobile personal computer (UMPC) 900 as shown in FIG. 20.

According to the above, the present invention really has industrial applicability, novelty and inventive steps, and has not been seen in products of the same kind or let used in public. Therefore, the present invention conforms to the requirements for an invention patent.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A method for manufacturing keypad having three-dimensional patterns, comprising the steps of:
    a) preparing a first mold, and filling a first ultra-violet curable resin in the first mold;
    b) disposing a shaping layer in the first mold, and overlapping the shaping layer on the first ultra-violet curable resin;
    c) irradiating the first ultra-violet curable resin with an ultra-violet lamp to cure the resin to form a pattern layer, and forming a plurality of three-dimensional patterns on a front surface of the pattern layer;
    d) preparing a second mold, and filling a second ultra-violet resin into the second mold;
    e) disposing an assembled structure formed in the step c) in the second mold and overlapping the assembled structure on the second ultra-violet curable resin;
    f) irradiating the second ultra-violet curable resin with the ultra-violet lamp to cure the resin to form a keycap layer, and forming a plurality of keycaps on a front surface of the keycap layer; and
    g) printing a shielding layer on a back surface of the shaping layer, and forming a plurality of hollowed regions beneath the three-dimensional patterns.

2. The method according to claim 1, wherein the three-dimensional patterns are embedded in the second ultra-violet curable resin respectively in the step e).

3. A method for manufacturing keypad having three-dimensional patterns, comprising the steps of:

a) preparing a first mold, and filling a first ultra-violet curable resin in the first mold;
b) disposing a shaping layer in the first mold, and overlapping the shaping layer on the first ultra-violet curable resin;
c) irradiating the first ultra-violet curable resin with an ultra-violet lamp to cure the resin to form a pattern layer, and forming a plurality of three-dimensional patterns on a front surface of the pattern layer;
d) preparing a second mold, and filling a second ultra-violet resin into the second mold;
e) disposing an assembled structure formed in the step c) in the second mold and overlapping the assembled structure on the second ultra-violet curable resin;
f) irradiating the second ultra-violet curable resin with the ultra-violet lamp to cure the resin to form a keycap layer, and forming a plurality of keycaps on a front surface of the keycap layer;
g) printing a shielding layer on a back surface of the shaping layer, and forming a plurality of hollowed regions beneath the three-dimensional patterns; and
h) overlapping a light-guiding plate on a back surface of the shielding layer.

4. The method according to claim 3, wherein the three-dimensional patterns are embedded in the second ultra-violet curable resin respectively in the step e).

5. A method for manufacturing keypad having three-dimensional patterns, comprising the steps of:
a) preparing a first mold, and filling a first ultra-violet curable resin in the first mold;
b) disposing a shaping layer in the first mold, and overlapping the shaping layer on the first ultra-violet curable resin;
c) irradiating the first ultra-violet curable resin with an ultra-violet lamp to cure the resin to form a pattern layer, and forming a plurality of three-dimensional patterns on a front surface of the pattern layer;
d) preparing a second mold, and filling a second ultra-violet resin into the second mold;
e) disposing an assembled structure formed in the step c) in the second mold and overlapping the assembled structure on the second ultra-violet curable resin;
f) irradiating the second ultra-violet curable resin with the ultra-violet lamp to cure the resin to form a keycap layer, and forming a plurality of keycaps on a front surface of the keycap layer;
g) printing a shielding layer on a back surface of the shaping layer, and forming a plurality of hollowed regions beneath the three-dimensional patterns;
h) overlapping a light-guiding plate on a back surface of the shielding layer; and
i) connecting a base layer to a back surface of the light-guiding plate by means of pressing.

6. The method according to claim 5, wherein the three-dimensional patterns are embedded in the second ultra-violet curable resin respectively in the step e).

7. The method according to claim 5, wherein the light-guiding plate is connected to the base layer via a hot pressing process in the step i).

\* \* \* \* \*